United States Patent [19]

Roller et al.

[11] 4,334,141

[45] Jun. 8, 1982

[54] COMBINED ELECTRIC WATER HEATING AND VESSEL SUPPORT PLATE FOR A BEVERAGE PREPARATION DEVICE

[75] Inventors: Hanno Roller; Helmut Ohnmacht, both of Kandel; Ludwig Lieber, Steinweiler; Karl-Heinz Nauerth, Erlenbach, all of Fed. Rep. of Germany

[73] Assignee: Firma Fritz Eichenauer, Kandel, Fed. Rep. of Germany

[21] Appl. No.: 3,896

[22] Filed: Jan. 16, 1979

[30] Foreign Application Priority Data

Feb. 4, 1978 [DE] Fed. Rep. of Germany ....... 2804818

[51] Int. Cl.³ .................... A47J 31/44; F24H 1/12; H05B 3/00
[52] U.S. Cl. ........................ 219/283; 99/288; 219/298; 219/299; 219/301; 219/302; 219/505; 338/22 R
[58] Field of Search ............... 219/296–309, 219/280–283, 504, 505, 311; 338/22 R; 99/288; 222/146 HE

[56] References Cited

U.S. PATENT DOCUMENTS

| 974,329 | 11/1910 | Aalborg | 219/301 |
|---|---|---|---|
| 1,215,748 | 2/1917 | Underwood | 219/298 X |
| 1,418,011 | 5/1922 | Mehn | 219/301 X |
| 1,696,758 | 12/1928 | Galdi | 219/298 |
| 3,338,476 | 8/1967 | Marcoux | 219/505 X |
| 3,748,439 | 7/1973 | Ting et al. | 219/505 X |
| 4,121,088 | 10/1978 | Doremus | 219/505 X |
| 4,147,927 | 4/1979 | Pirotte | 219/505 X |

FOREIGN PATENT DOCUMENTS

| 3521 | of 1926 | Australia | 219/299 |
|---|---|---|---|
| 24122 | 8/1935 | Australia | 219/301 |
| 133750 | 8/1949 | Australia | 219/302 |
| 513369 | 10/1939 | United Kingdom | 219/301 |
| 915826 | 1/1963 | United Kingdom | 219/302 |
| 1151214 | 5/1969 | United Kingdom | 219/303 |

*Primary Examiner*—A. Bartis
*Attorney, Agent, or Firm*—Craig and Antonelli

[57] ABSTRACT

A combined water heating and vessel support plate for supporting the vessel of a beverage preparation device includes a heating slab having a water flow-through duct constituted by longitudinal apertures in a plurality of prismatic (preferably rectangular) heating-plate segments which are clamped together side-by-side with PTC ceramic electrical resistance heating elements interposed between them. The duct is completed by connecting the apertures externally by tubes or by duct-incorporating end caps on the heating plate to form a continuous flow path from an inlet to an outlet. Various clamping arrangements, preferably with some resilience, are described, as are the use of inter-segment filling materials and electrically insulating materials with good heat-conducting properties, also the selection and positioning of the heating elements to achieve a desired heating effect. The top surfaces of the segments are coplanar and form a flat vessel support surface for heating a vessel placed thereon.

12 Claims, 7 Drawing Figures

COMBINED ELECTRIC WATER HEATING AND VESSEL SUPPORT PLATE FOR A BEVERAGE PREPARATION DEVICE

The invention relates to an electrical resistance heating device of the kind having at least one heating element and having a water flow-through duct, the heating element or elements and the water flow-through duct being in thermally conductive communication. More particularly, although not exclusively, the invention is concerned with electrical resistance heating devices of this construction such as are used for beverage preparation machines such as coffee-making machines or the like. In such cases the cold water, contained in a vessel situated above the level of the heating device, enters by way of an inlet conduit into the water flow-through duct, is heated therein and is conducted for example on to ground coffee provided in a filter. Usually, this receptacle is placed on a stand which is in thermally conductive communication with the heating device and thus keeps the coffee beverage warm.

In electrical resistance heating devices of the above-specified kind which are known (in practical use) the heating element comprises an electrical tubular heating body which is soldered or welded to the water flow-through duct, the latter being a metal tube or pipe, to make the thermally conductive connection. Usually temperature regulator is also provided, which interrupts the supply of electric current when the water supply has been used up. Additionally there is provided a device for protecting against overheating, in the form of a temperature-responsive safety fuse, in order to prevent destruction of the plastics material housing by overheating in the event of running dry.

In this known constructional form, a thermal efficiency is achieved which is not yet completely satisfactory, and more particularly the transfer of heat between the heating element and the water flow-through duct is capable of improvement. Furthermore, these known electrical resistance heating elements are relatively expensive as regards production and fitting in the apparatus in which they are to be used. More particularly, however, with these known heating devices there is the disadvantage that making different dimensional requirements or different power requirements can only be met by designing and making both the tubular heating body and the water flow-through duct separately for each individual task. This makes the adaptation to different purposes complicated and expensive.

An object of the present invention is to provide an electrical resistance heating device, of the kind initially specified herein, which while affording improved thermal efficiency, may be produced, fitted and more particularly adapted for different kinds of use and different tasks in a simple and inexpensive way.

According to the present invention there is provided an electrical resistance heating device having at least one heating element and having a water flow-through duct, which element and duct are in heat-conducting communication, said device comprising a plurality of prismatic heating-plate segments which are arranged adjacent one another and clamped together, said element being disposed between mutually facing surfaces of adjacent heating-plate segments, and the water flow-through duct comprising longitudinal apertures of the heating-plate segments, which apertures are connected to one another externally to form a continuous duct.

According to a feature of the invention the heating device is assembled from an optional or selectable plurality of heating-plate segments which are identical to one another, the heating elements being arranged in each case in sandwich fashion between adjacent heating-plate segments; if the entire structure is clamped together, the heating elements are in optimum thermal contact with the heating-plate segments and thus also with the water flow-through duct extending through the heating-plate segments. The entire structure, comprising heating-plate segments and heating elements, forms a heating plate or slab which can be fitted in a very simple way in an apparatus and at the same time can be constructed so that it itself forms a heat-dispensing stand or supporting surface for a coffee pot or the like, so that there is no need to provide an additional plate for the coffee pot to stand on. Above all it is a significant point that the heating plate comprises a selectable number of heating-plate segments which are identical to one another and can therefore be standardised to a very considerable extent. In addition there is also the possibility of varying, as desired, the distribution of the heating elements between the heating-plate segments; for example, the heating elements can be arranged at different spacings, or no heating elements at all can be provided between individual segments of the heating plate. Thus it is possible to adapt to many different requirements as regards dimensions, power demand and power density.

The heating-plate segments in accordance with the invention are prismatic in shape, and various cross-section forms can be selected. Production can be, for example, by casting or by cutting suitably shaped bar material to the desired lengths. Each of the heating-plate segments comprises a through longitudinal aperture, and a continuous water flow-through duct is provided by connecting the individual longitudinal apertures together outside the heating-plate segments; they may be connected in parallel, in series or in mixture of both, as required.

Within the framework of the invention, it is possible in principle to use heating elements of many different types including, for example, heating elements of the hitherto conventional and widely used type having a metal resistance conductor. More particularly, however, the invention proposes that the heating element or elements should comprise a material with a positive temperature-coefficient of electrical resistance (PTC material). Such PTC heating elements are known per se (cf. German laid-open specification No. 25 04 237), usually consist of a ceramic material, more particularly having a barium titanate base, and have the property of being more-or-less self-stabilising as regards their electrical power consumption. In the cold state their resistance is low: consequently, with a given electrical voltage, a relatively high current flows. As a result, it is only a short time before the operating temperature is reached, with the specified operating resistance. If for any reason the temperature of the PTC heating element increases beyond the specified temperature, the resistance increases further so that the converted electrical power is reduced. Consequently, when using PTC heating elements it is possible to dispense with temperature regulators and devices for protection against overheating. The use of such PTC heating elements, however, is not straightforwardly possible. On the one hand the usual fitting and assembly measures cannot be used with PTC heating elements since these are usually available in the form of relatively small, usually plane parallel plates. On the other hand when using PTC heating elements very special care must be taken to achieve a perfect thermal contact. For the arrangement according to the invention as discussed hereinbefore it is of particular importance that it allows the use of PTC heating elements in electrical resistance heating devices of the kind specified initially herein.

In more detail, the arrangement is preferably such that the heating elements consist of substantially plane parallel plates of PTC-ceramic, and the heating-plate segments have a rectangular cross-section. The heating-plate segments are moreover supported and orientated not directly on one another but indirectly on one another by way of the heating elements, and the arrangement is made such that a substantially flat structure results. The heating elements are usually metal-coated or metallised on their broad sides or major surfaces and connected to supply leads by soldering. In order to avoid disturbing the parallel arrangement it is advisable to arrange the solder points at the narrow sides or edges of the heating elements, or to provide corresponding recesses on the mutually facing surfaces of the heating-plate segments. Moreover, it is advisable to insulate the heating elements from the heating-plate segments by inserts of electrically insulating material with good heat-conducting properties, for example aluminium oxide ceramic. To improve heat transfer, and to obtain the most uniform heating of the entire arrangement which can be achieved, it is advisable to fill up the free spaces between neighboring segments with an electrically insulating filling with good thermal conducting properties, for example silicone rubber.

The heating-plate segments can be clamped together in various ways. A first possibility is to provide the heating-plate segments with transverse apertures, which are in alignment with one another, and to clamp by means of screw-bolts which extend through the transverse apertures. Of course in this case the transverse apertures must not cut into the longitudinal apertures which form the water flow-through duct. In order to achieve a specific pressure effect it may be advisable to provide the screw bolts with spring washers.

Another possibility is to provide the heating-plate segments at their ends with at least one connecting lug each, and to clamp them together by connecting elements which connect the lugs of adjacent segments in pairs. It is preferable to use a constructional form wherein two lugs are provided at each end of each heating-plate segment. The lugs can be connected together by means of screws inserted in holes. An even simpler possibility is to construct the connecting elements as bowed elements engaging over the lugs. In order to ensure that these bowed elements are particularly securely seated, it may be advisable to provide catches or detents on the lugs, such as notches, recesses or the like, into which the bowed elements are inserted. In a particularly advantageous constructional form of this kind the bowed elements are constructed as spring clips which are preferably of substantially U-shaped form and thus allow a certain yielding, so that no uncontrollable stresses act on the heating elements. Where there is no inherently yielding clamping arrangement of this kind, or also if necessary in addition thereto, it is possible to obtain a specific pressure on the heating elements by providing, between at least one side of the heating elements and the adjoining surface of one of the neighbouring segments, resilient supporting element which of course should also ensure that heat is conducted away in a satisfactory manner. This kind of resilient supporting element can be made, for example, in the form of a corrugated spring plate, conveniently of metal.

In order to establish a connection between the individual longitudinal apertures in a simple manner, to constitute a continuous water flow-through duct, it is advantageous to provide the heating-plate segments at their ends with connecting pieces associated with the longitudinal apertures. These connectors can be in the form of simple stub pipes or hose nipples, for example, and may be cast-on, turned from bar material or cemented or glued into the longitudinal apertures. In this constructional form, connection can be achieved in a very simple manner by suitable lengths of flexible tubing. Another possibility consists in applying to the ends of the heating-plate segments, in sealed manner, rigid connection caps which comprise connecting ducts associated with the longitudinal apertures and connected to inlet and outlet means. The arrangement of the connecting ducts defines the way in which the longitudinal apertures of the individual heating-plate segments are connected to one another in parallel or in series as appropriate.

The invention will be more fully explained hereinafter with reference to the accompanying drawings in which, by way of example:

Figure 1:
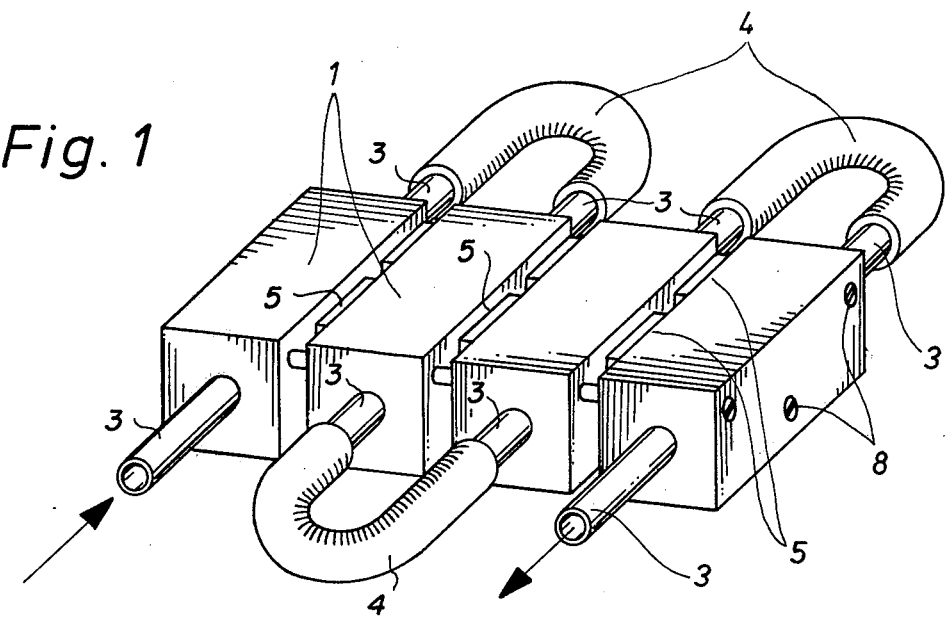
FIG. 1 shows in perspective an electrical resistance heating device.

The electrical resistance heating device shown in FIG. 1 is intended as a heating plate for a coffee-making machine, but can also be used, suitably arranged, for many other purposes. It can be seen clearly how the heating device is built up of a plurality of prismatic heating-plate segments 1 of rectangular cross-section which are arranged side-by-side with parallel surfaces facing one another. Each of the heating-plate segments comprises a through longitudinal aperture 2 (not shown in FIG. 1, but shown in FIG. 3) to which a connector 3 is connected at each of the two ends of the heating-plate segments 1 in each case. The longitudinal apertures 2 are connected to one another by sections of hose or tubing 4 fitted on to the connectors 3 to constitute a continuous water flow-through duct. Between the mutually facing surfaces of adjacent heating-plate segments 1, heating elements 5 are arranged. In the illustrated constructional example these comprise plane parallel plates of PTC material, are metal-coated at their broad sides or major surfaces facing towards the heating-plate segments 1, and are connected with supply lead wires 6, for example by soldering. The heating elements 5 are also electrically insulated from the heating-plate segments 1 by inserts 7 which are interposed at both sides and consist of electrically insulating material with good heat-conducting properties, for example aluminium oxide ceramic material. As partially illustrated in FIGS. 2 and 3, the remaining intermediate spaces between the heating-plate segments 1 may additionally be cast-in or filled with an electrically insulating filling 19 with good heat-conducting properties, for example silicone rubber. In the arrangement described, the heating-plate segments 1 are clamped with the interposed heating elements 5, so that, because of the surface pressure thereby produced, an excellent transfer of heat is insured between the heating elements 5 and the water flowing through the longitudinal apertures 2.

Figure 2:
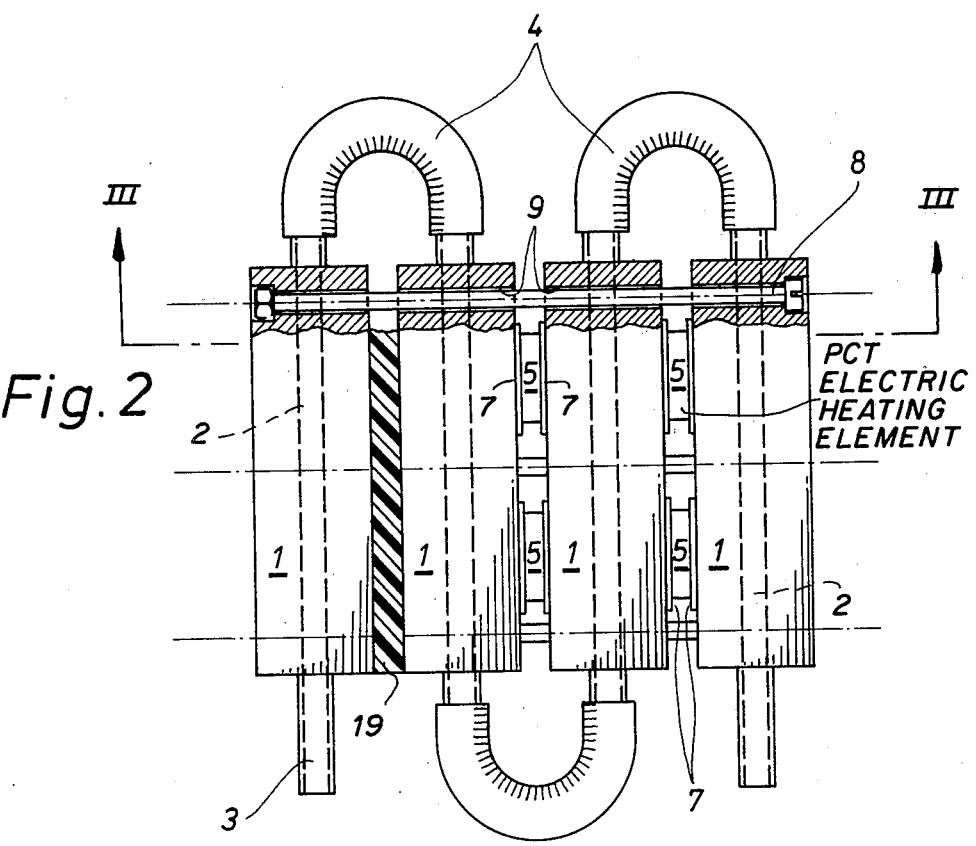
FIG. 2 shows a plan view of the subject of FIG. 1.
Figure 3:
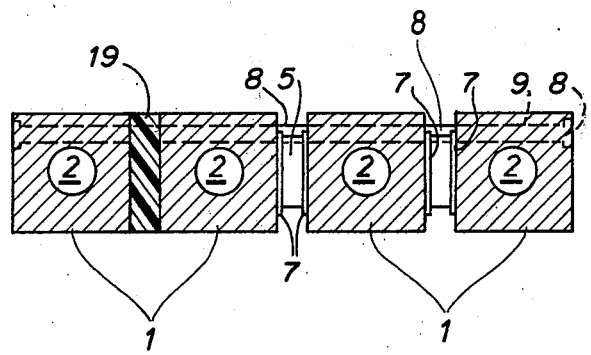
FIG. 3 shows the subject of FIG. 2 in a section on III—III.

In the constructional form shown in FIGS. 1 to 3, the heating-plate segments 1 are clamped together by screw-bolts 8 which extend through transverse apertures 9 provided for this purpose, in alignment with one another, in the heating-plate segments 1. As FIGS. 1 and 2 show, the transverse apertures 9 are so arranged that they do not intersect the longitudinal apertures 2.

Figures 4, 5:
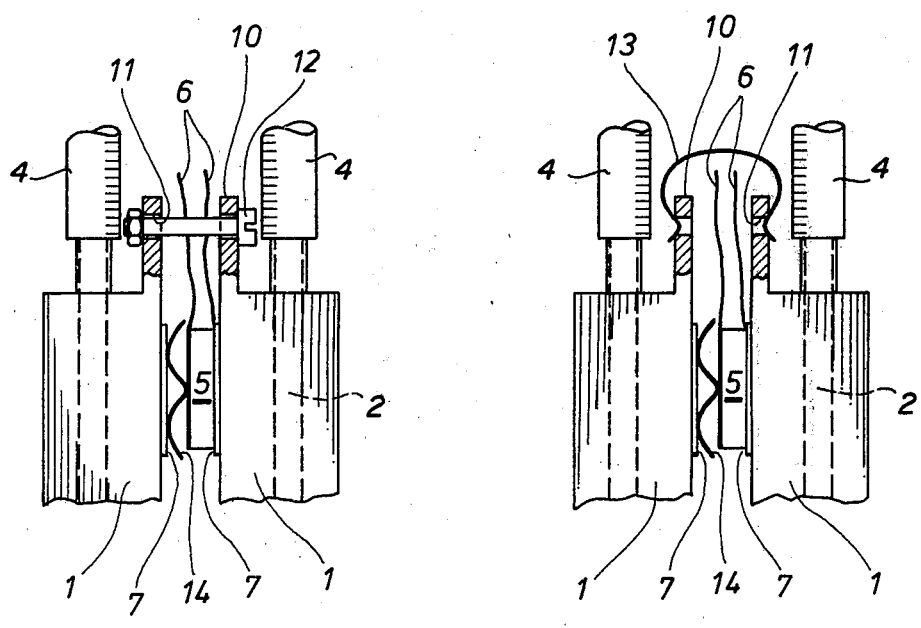
FIG. 4 shows in fragmentary manner another constructional form of the subject of FIG. 2.
FIG. 5 shows in fragmentary manner a further construction form of the subject of FIG. 2.

FIG. 4 shows another constructional form for the clamping of the heating-plate segments 1. Here, connecting lugs 10 are formed on the ends of the heating-plate segments 1, and in fact—since here only a total of two heating-plate segments 1 are provided—only one connecting lug 10 at each end. For clamping purposes, the connecting lugs 10 of the adjacent heating-plate segments 1 are connected to one another in pairs by means of screws 12 inserted in holes 11.

In the constructional form shown in FIG. 5, connecting lugs 10 are also formed on the ends of the heating-plate segments 1. Here, connection is effected by means of bowed elements which engage over the connecting lugs 10 and are constructed as U-shaped spring clips 13 which snap into catches or detents in the form of holes 11, but these could also be recesses or the like.

Whilst the clamping arrangement in the constructional form shown in FIG. 5 already has a certain amount of elastic yieldingness because of the spring clips 13, the clamping arrangement in the constructional form shown in FIGS. 1 to 4 is rigid. At least in the case shown in FIGS. 1–4, but in some circumstances in an arrangement as shown in FIG. 5 also, it is advisable to provide resilient supporting element which prevents excessive stresses on the heating elements 5. Such a resilient supporting element is shown in FIGS. 4 and 5 in the form of a corrugated spring plate 14 which at the same time constitutes heat transfer means between the heating element 5 and the corresponding heating-plate segment 1.

In all cases it is recommended to make the heating-plate segments as castings or from bar material of aluminium or an aluminium alloy.

Figure 6:
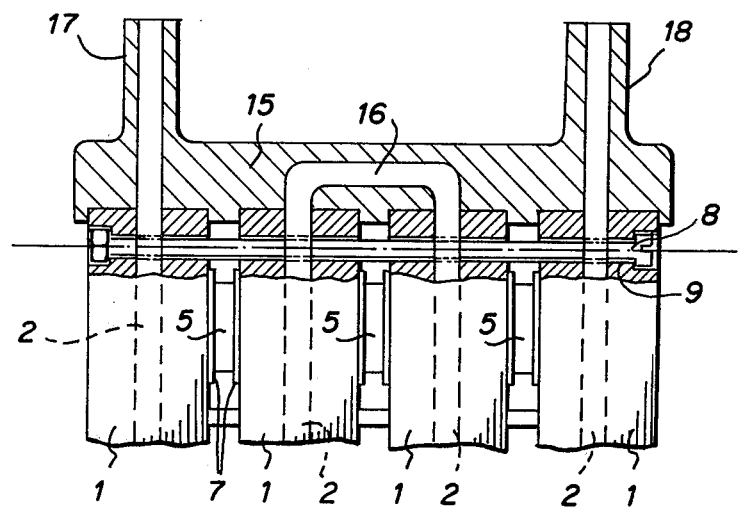
FIG. 6 shows in fragmentary manner an even further constructional form of the subject of FIG. 2.

In the constructional form shown in FIG. 6, a rigid connection cover 15 may be utilized in place of the tubing 4, as shown in FIGS. 1 and 2, to effect a water flow-through connection between respective heating-plate segments 1. In this respect, the cover 15 is applied in a sealed manner to the ends of the heating-plate segments 1 and has contained therein a connecting duct 16 which is alignable with respective ducts 2, so as to complete a waterthrough connection in the same manner as accomplished through the use of tubing 4. Additionally, the connection cover 15 may contain an inlet 17 and an outlet 18 for directing water to and from the heating device of the present invention. The end cap 15 may be constructed to contain any number of connecting passages 16 which would then be alignable with throughflow ducts 2 contained within heating-plate segments 1.

Figure 7:
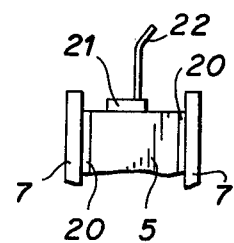
FIG. 7 shows an electrical solder connection to a heating element.

FIG. 7 shows a heating element 5 metal-coated or metallized on its broad sides or major surfaces at 20 and connected to a supply lead 22 by solder 21 at the narrow side or edge of the heating element.

What is claimed is:
1. In a beverage preparation device for a vessel,
a combined water heating and vessel support plate member for supporting the vessel for the device, said plate member comprising
a heating slab including a freely selectable number of heating-plate segments of good heat conductivity and plate-like electric heating elements of positive temperature coefficient electrical resistance, wherein:
the heating-plate segments each being provided with a water flow-through duct, means for clamping adjacent heating-plate segments together side-by-side with their top surfaces coplanar to form a flat vessel support surface, the water flow-through duct of each segment comprising a longitudinal aperture, the apertures of adjacent segments being operatively connected to form a continuous duct having an inlet at one end and an outlet at the other end, and
at least one heating element being disposed between each adjacent pair of heating-plate segments in heat exchange contact with the adjacent segments, and wherein
any free intermediate space between heating-plate segments is filled with an electrically insulating filling composition which is a good conductor of heat.
2. A beverage preparation device according to claim 1, in which said heating elements each comprise a substantially plane parallel plate of PTC-ceramic material and the heating-plate segments are of rectangular cross-section.
3. A beverage preparation device according to claim 1, in which said at least one heating element is insulated from the adjacent heating-plate segments by inserts of an electrically insulating material which is a good conductor of heat.
4. A beverage preparation device according to claim 1, in which the clamping means comprise transverse apertures in the heating-plate segments which are in alignment with one another and screw-bolts which extend through the transverse apertures and clamp the segments.
5. A beverage preparation device according to claim 1, in which the clamping means comprise at least one connecting lug at each end of each segment and connecting elements which connect in pairs the connecting lugs at the corresponding ends of adjacent heating plate segments.
6. A beverage preparation device according to claim 5, in which the connecting lugs are formed with holes and are connected by means of screws which are inserted in the holes and form said connecting elements.
7. A beverage preparation device according to claim 5, in which the connecting elements consist of bowed elements engaging over the connecting lugs.
8. A beverage preparation device according to claim 7, in which the bowed elements consist of spring clips.
9. A beverage preparation device according to claim 1, in which a resilient supporting element of heat conducting material is provided between at least one side of each of said at least one heating element and the adjoining surface of the adjacent segments.
10. A beverage preparation device according to claim 1, in which the heating-plate segments comprise at their ends connectors which are associated with the longitudinal apertures.

11. A beverage preparation device according to claim 1, in which rigid connection covers are applied in sealed manner to the ends of the heating-plate segments, the said covers being formed with communicating ducts which are associated with the longitudinal apertures and are connected to inlet and outlet means.

12. A beverage preparation device according to claim 1, in which said heating elements each comprise a plate of material having metal-coating on broad sides facing adjoining segments and soldered narrow sides for connection to supply leads.

* * * * *